No. 833,949. PATENTED OCT. 23, 1906.
J. F. WHITE.
WAGON JACK.
APPLICATION FILED MAR. 30, 1903.
2 SHEETS—SHEET 1.
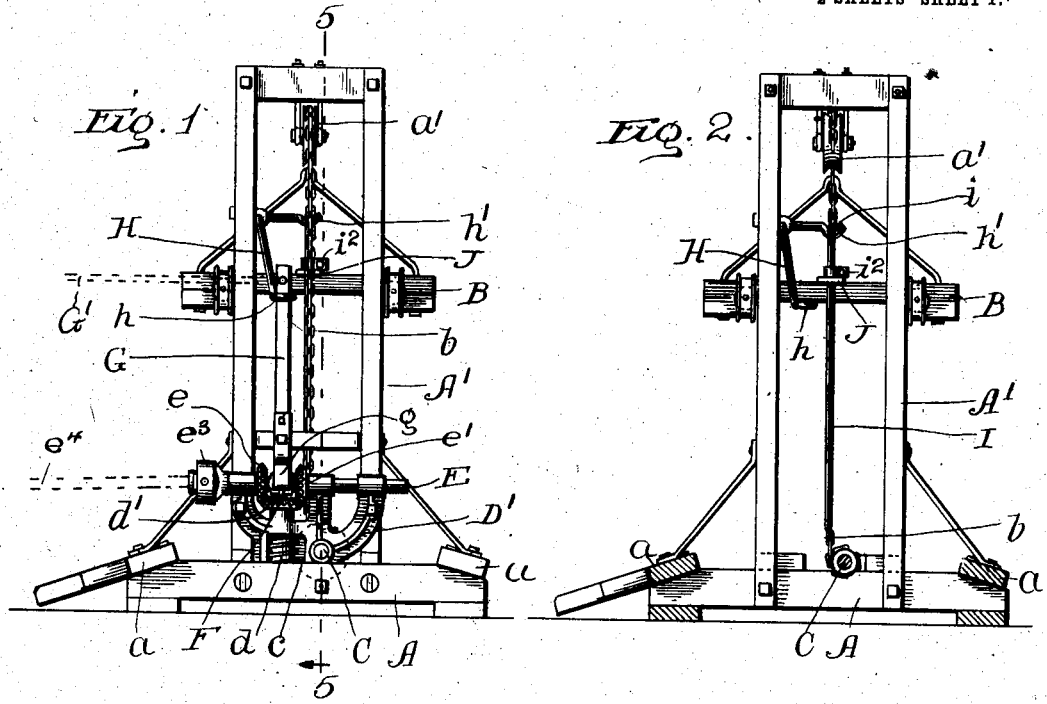
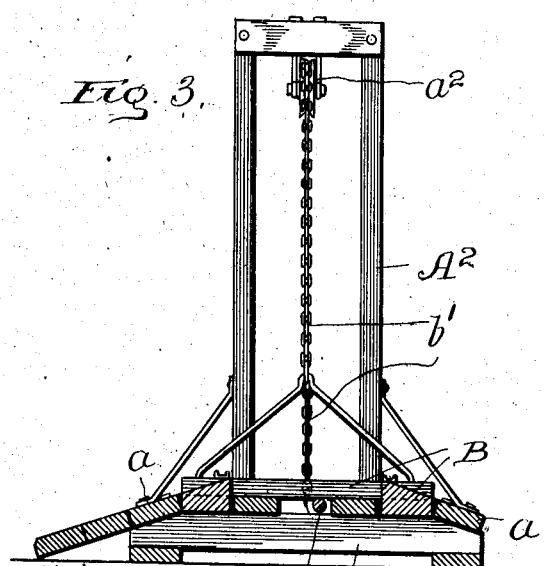
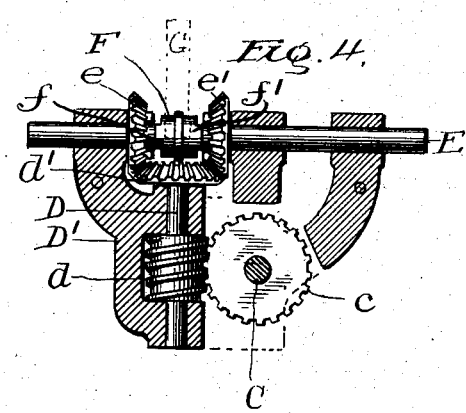
Witnesses:
Russell Wiles
Chas. O. Shurvey
Inventor:
John F. White
by H. Bitner,
Atty.
THE NORRIS PETERS CO., WASHINGTON, D. C.

No. 833,949. PATENTED OCT. 23, 1906.
J. F. WHITE.
WAGON JACK.
APPLICATION FILED MAR. 30, 1903.
2 SHEETS—SHEET 2.
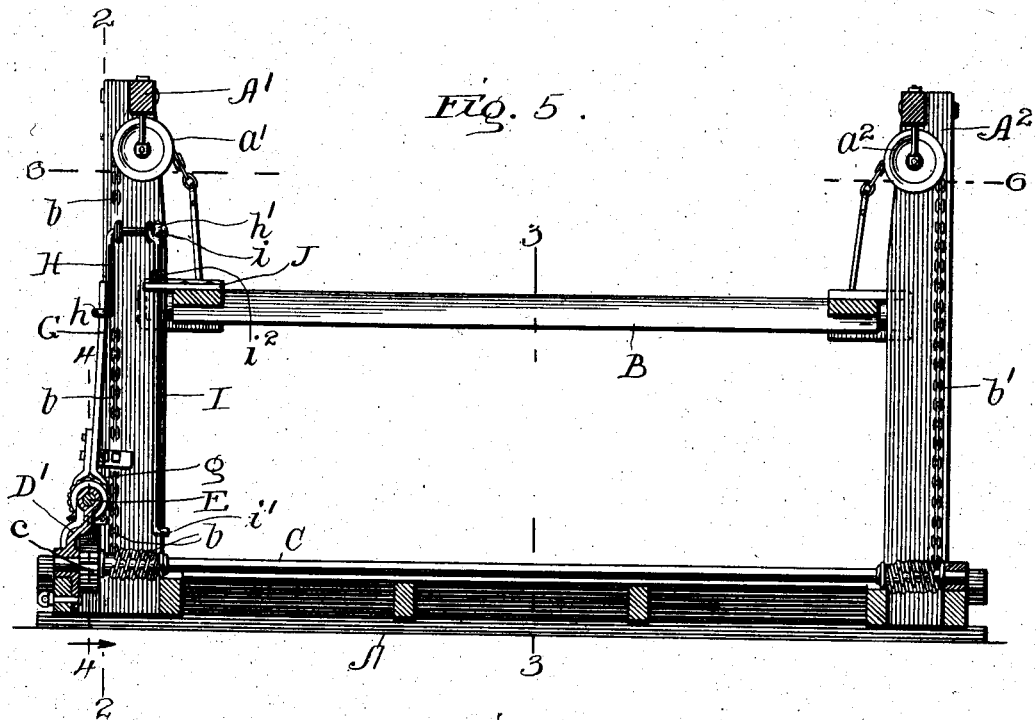
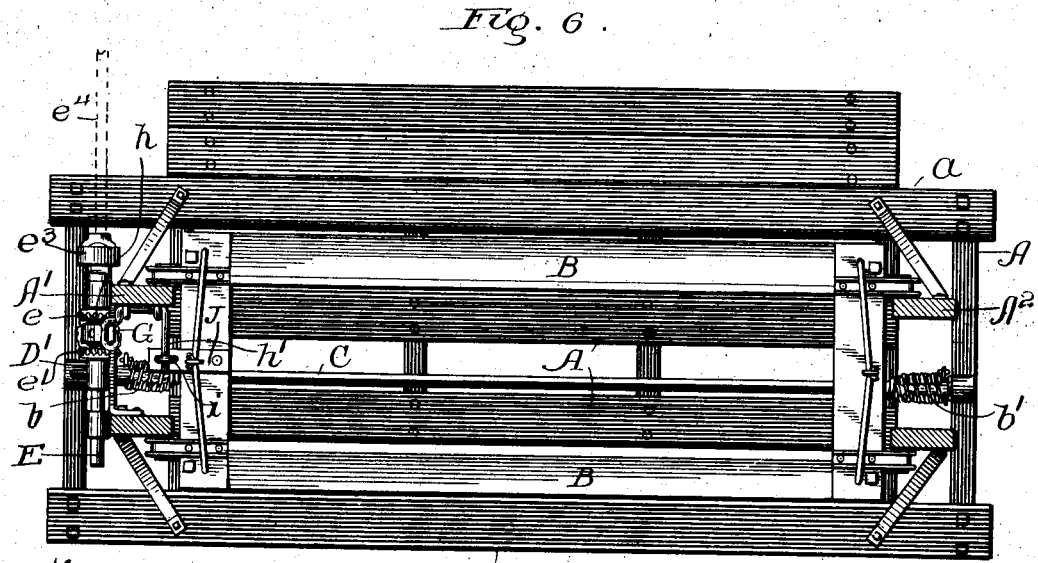
Witnesses:
Russell Wiler
Chas. O. Shurvey
Inventor:
John F. White
by H. Bitner
Atty.

UNITED STATES PATENT OFFICE.

JOHN F. WHITE, OF BLOOMINGTON, ILLINOIS, ASSIGNOR TO PORTABLE WAGON DUMP AND ELEVATOR COMPANY, A CORPORATION OF ILLINOIS.

WAGON-JACK.

No. 833,949.   Specification of Letters Patent.   Patented Oct. 23, 1906.

Application filed March 30, 1903. Serial No. 150,105.

*To all whom it may concern:*

Be it known that I, JOHN F. WHITE, a citizen of the United States of America, residing at Bloomington, in the county of McLean and State of Illinois, have invented certain new and useful Improvements in Wagon-Jacks, of which the following is a specification.

My invention relates to certain new and useful improvements in wagon-jacks; and its object is to produce a device of this class upon which the front wheels of a wagon may be run and which can then be bodily raised to tilt the wagon backward for the purpose of unloading it.

To this end my invention consists in certain novel features of construction which are clearly illustrated in the accompanying drawings and described in the following specification.

In the aforesaid drawings, Figure 1 is an end elevation of my improved jack. Fig. 2 is a vertical cross-section in the line 2 2 of Fig. 5 looking in the direction of the arrow. Fig. 3 is a similar section in the line 3 3 of Fig. 5 looking in the same direction. Fig. 4 is a vertical section through the gearing mechanism, taken in the line 4 4 of Fig. 5 looking in the same direction. Fig. 5 is a vertical longitudinal section in the line 5 5 of Fig. 1 looking in the direction of the arrow, and Fig. 6 is a horizontal section in the line 6 6 of Fig. 5 looking downward.

Referring to the drawings, A is a suitable base having slanting sides $a\ a$, which permit a wagon to run up over them. To this base are secured at the two ends upright frames $A'\ A^2$ of any desired form, but of sufficient strength and rigidity to support the weight of the wagon. A rising platform B, preferably made in the form of a rectangular frame, fits into the base A, the surface of this platform being when in position upon the base slightly higher than said base, but beveled, so that a wagon may be run over it without any difficulty. It will be observed that owing to the fact that the platform B is made in the form of a hollow frame the wheels of the wagon will have no tendency to run off when the frame is raised or before. In the upright frames $A'\ A^2$ are journaled pulleys $a'\ a^2$, over which run chains $b\ b'$, which are attached by suitable bails to the platform B.

In the base of the jack is journaled a shaft C, to which are secured the chains $b\ b'$ aforesaid. It will be noted, therefore, that as the shaft C is rotated in one direction the chains will be wound up and the platform B raised and when it is rotated in the other direction the platform will be lowered. Upon one end of the shaft C is secured a pinion $c$, in mesh with a worm $d$ upon a vertical shaft D, journaled in a suitable bracket D', secured to the base of the jack. To the upper end of the shaft D is secured a beveled pinion $d'$, in mesh with two beveled pinions $e\ e'$, which are loose upon a horizontal shaft E, journaled, as will be seen in the drawings, in the bracket D' aforesaid. Keyed to the shaft E and longitudinally movable thereon is a collar F, provided with clutch-teeth $ff'$, adapted to engage with the two pinions $e\ e'$. A lever G, provided at its lower end with a fork $g$ and engaging with the collar, is pivoted upon a standard A' aforesaid in such manner that when the lever is oscillated upon its pivot the collar will be shifted so that the clutch-teeth may be left free from engagement from both pinions, as shown in Fig. 4, or in engagement with either of them, as desired.

The shaft E projects at each end from the bracket D', and one of its ends is secured by a universal joint $e^3$ to a tumbling-rod $e^4$. (Shown in dotted lines only.) The shaft projects at both ends from the bracket in order that the tumbling-rod may be secured on either side of the jack, depending on the position of the jack relative to the source of power. The shaft E is continuously rotated by this tumbling-rod.

To the standard A' is pivoted a lever H, provided at its lower end with an eye $h$, which engages the lever G to rotate said lever upon its pivot. The other end of the lever H is provided with a hook $h'$, engaging with an eye $i$ of a rod I, and thereby supporting the latter. The lower end of the rod I is provided with a projecting end $i'$, adapted to be engaged by a plate J, secured to the platform B, when said platform comes down. On the upper part of the rod I is a movable collar $i^2$, adapted to be engaged by said plate J when the platform rises. The rod I passes through a hole in this plate and is thereby kept in a vertical line.

The operation of this device will be readily apparent from the above description of its construction. Assuming the platform to be in its lower positon, as shown in Fig. 3, and a wagon in place with its front wheels upon the platform, the upper end of the lever G is thrown to the left from the position shown in Fig. 1. This throws the clutch F to the right and causes the pinion e' to move with the shaft E. This turns the shaft D in one direction and causes the shaft C to rotate in such manner as to wind up the chain, and consequently raise the platform. When the platform reaches its upper limit of motion, the plate J engages with the collar $i^2$, thereby raising the rod I and swinging the upper end of the lever G to the right. This throws the collar to the left and out of engagement with either of the beveled pinions e e', thereby stopping the rotation of the shafts D and C. Inasmuch as one of the members of the train of gears is a worm, the platform stays in its upper position, being held locked there by the gearing. When it is desired to lower the platform, the upper end of the lever G is swung manually still farther to the right, which forces the collar into engagement with the pinion e. This of course causes the shaft D to rotate in the reverse direction and causes the platform to descend. When the platform reaches the bottom, the plate J engages with the end piece i' on the rod I, pulls down the rod I, and swings the upper end of the lever G to the left, thus releasing the collar F from engagement with the pinion e, and consequently stopping the rotation. The particular advantage of this construction lies in the fact that the collar $i^2$ is adjustable upon the rod I, so that the machine can be set to stop its upward motion at any height. This is particularly advantageous, owing to the fact that it is frequently necessary to use this type of jack upon sloping ground, in which case unless some such device is provided it is impossible to cause the wagon to tilt to the right angle to dump the grain. Some such adjustable mechanism for causing the wagon to tilt to the right angle is necessary because the wagon is usually dumped into an elevator, and it must be raised far enough to make its rear end contact with the elevator and yet not far enough to throw the entire weight of the wagon on the elevator so as to damage it.

Another advantage lies in the fact that the shaft which drives the mechanism is so arranged that power can be applied indefinitely to either end of it, so that the device may be used without arranging the engine or other source of power especially for the purpose.

Another advantage of this construction lies in the fact that when the platform has reached its upper or lower position, it is impossible for the operator to accidentally throw the clutch into engagement with the wrong gear, and thereby injure the machine. The lever G is usually connected by a rod (shown in dotted lines at G' in Fig. 1) to a point at considerable distance from the jack, where the operator stands and accidents of the kind would be likely to occur. When the platform reaches its highest point, it is impossible to swing the lever G to the right because the collar $i^2$ is in engagement with the plate J, and when the platform is down the lever cannot be swung to the left because of the engagement of the end of the rod I with the plate J.

I realize that considerable variations are possible in the details of this construction without departing from the spirit of the invention, and I therefore do not intend to limit myself to the specific form herein shown and described except as pointed out in the claims.

I claim as new and desire to secure by Letters Patent—

1. In a device of the class described, the combination with a pair of standards suitably connected at their lower ends and a vertically-movable platform guided therein, of pulleys supported in said standards, a shaft journaled at the bottoms of said standards and extending from one to the other, drums upon said shaft, flexible connecting devices secured to the platform and extending over the pulleys to the drums, a continuously-rotating shaft, suitable gearing between said continuously-rotating shaft and the drum-shaft, a clutch, a lever actuating said clutch, a bell-crank lever pivoted to one of the standards having one arm engaging said lever, a rod supported upon the other arm, a stop upon the lower end of said rod lying in the path of the platform and an adjustable stop secured upon said rod in the path of the platform in its upward movement.

2. In a device of the class described, the combination with a pair of standards suitably connected at their lower ends and a vertically-movable platform guided therein, of pulleys supported in said standards, a shaft journaled at the bottoms of said standards and extending from one to the other, drums upon said shaft, flexible connecting devices secured to the platform and extending over the pulleys to the drums, a continuously-rotating shaft, a counter-shaft, suitable gearing between said continuously-rotating shaft and the counter-shaft adapted to rotate said counter-shaft in either direction, means operated by the movement of the platform in either direction for throwing said gearing out of engagement, a worm upon said counter-shaft, a worm-gear upon the drum-shaft in engagement with said worm, said worm-and-gear connection being adapted to furnish means to hold the platform in its raised position when the clutch has been disengaged.

3. In a device of the class described, the combination with a pair of standards suitably connected at their lower ends and a vertically-movable platform guided therein, of pulleys supported in said standards, a shaft journaled at the bottoms of said standards, and extending from one to the other, drums upon said shaft, connecting devices secured to the platform and extending over the pulleys to the drums, a continuously-rotating shaft, a counter-shaft, a worm-and-gear connection between said counter-shaft and the drum-shaft, suitable gearing between the counter-shaft and the continuously-rotating shaft adapted to rotate the counter-shaft in either direction, a clutch adapted to throw said gearing into or out of engagement, a lever operating said clutch, a bell-crank lever pivoted upon one of the standards and having an arm engaging the clutch-lever, a rod supported by the other arm of the bell-crank lever having a stop upon its lower end adapted to be engaged by the platform as it comes to its lower limit of movement, and an adjustable stop upon the upper end of said rod lying in the path of the platform in its upper limit of movement.

4. In a device of the class described, the combination with a pair of standards suitably connected at their lower ends and a vertically-movable platform guided therein, of pulleys journaled in the upper ends of the standards, a drum-shaft journaled in the lower ends of the standards, suitable connecting devices supporting the platform and extending over the pulleys to the drum-shaft, a continuously-rotating shaft, a counter-shaft, suitable gearing between the continuously-rotating shaft and the counter-shaft, whereby rotation of said counter-shaft in both directions may be had, a clutch adapted to throw said gear into or out of engagement, a bell-crank lever pivoted to one of the standards adapted to actuate said clutch, a rod supported by one of the arms of the said bell-crank lever, a bracket upon the platform running upon said rod, a stop upon the lower end of the rod and an adjustable stop upon the upper end of the rod.

5. In a portable grain-dump, the platform therefor, a raisable platform therefor for the front wheels of a wagon to be unloaded, cables attached to the latter platform, winding-drums for taking up and paying out the cables, a shaft for the drums, a worm-wheel thereon, a worm for engaging and driving the worm-wheel, a shaft for carrying the worm, a drive-shaft adjacent the worm-shaft, connection between both the latter shafts for driving the worm-shaft in one direction, said connection also adapted to reverse the movement of the worm-shaft while the said drive-shaft is in continuous revolution.

6. In a wagon-dump, a drum-shaft, a worm thereon, a worm-shaft carrying a worm meshing therewith, a gear-wheel secured to said worm-shaft, a drive-shaft, a pair of gears loosely mounted on said drive-shaft and meshing with the gear on the worm-shaft, and means for causing either of said pair of gears to rotate with said drive-shaft.

7. In a wagon-dump, elevating means for the front end of a wagon, actuating means therefor including a drum-shaft, a worm-wheel carried thereby, a worm-shaft, a worm thereon meshing with said worm-wheel, a drive-shaft, a gear rigidly secured to one of said two last-mentioned shafts, a pair of gears loosely mounted on the other of said shafts and meshing with said first-mentioned gear, and a clutch member movable to a position to cause either of said pair of gears to rotate with its shaft.

8. In a wagon-dump, the combination with means for supporting the front end of a wagon, of means for raising and lowering said supporting means, a worm-gearing for actuating said raising and lowering means, comprising a worm-wheel and a worm-shaft, a constantly-driven power-shaft, a gearing directly connecting the power-shaft and worm-shaft for moving the same in both directions, and shiftable means for causing the reversal of movement of the worm shaft and wheel.

9. In a wagon-dump, the combination with means for supporting the front end of a wagon, of means for raising and lowering said supporting means, a worm-gearing for actuating said raising and lowering means, comprising a worm and a worm-shaft, a constantly-driven power-shaft, beveled gearing directly connecting the power-shaft and worm-shaft for moving the latter in both directions, and shiftable means for effecting the reversal of movement of the worm shaft and wheel.

In witness whereof I have signed the above application for Letters Patent, at Bloomington, in the county of McLean and State of Illinois, this 25th day of March, A. D. 1903.

JOHN F. WHITE.

Witnesses:
W. C. GILMORE,
MABEL DAVISON.